No. 734,662. PATENTED JULY 28, 1903.
R. W. BLAISDELL.
BICYCLIST'S STRENGTH TESTING MACHINE.
APPLICATION FILED OCT. 13, 1902.
NO MODEL.

Witnesses:
Walter E. Lombard
Nathan C. Lombard 2nd

Inventor:
Robert W. Blaisdell,
by Alban Andrew,
Atty.

THE NORRIS PETERS CO., PHOTO-LITHO., WASHINGTON, D. C.

No. 734,662.

Patented July 28, 1903.

UNITED STATES PATENT OFFICE.

ROBERT W. BLAISDELL, OF BEVERLY, MASSACHUSETTS, ASSIGNOR OF ONE-HALF TO HEZEKIAH O. WOODBURY, OF BEVERLY, MASSACHUSETTS.

BICYCLIST'S STRENGTH-TESTING MACHINE.

SPECIFICATION forming part of Letters Patent No. 734,662, dated July 28, 1903.

Application filed October 13, 1902. Serial No. 127,096. (No model.)

*To all whom it may concern:*

Be it known that I, ROBERT W. BLAISDELL, a citizen of the United States, and a resident of Beverly, in the county of Essex and State of Massachusetts, have invented certain new and useful Improvements in Bicyclists' Strength-Testing Machines, of which the following is a specification.

This invention relates to improvements in bicyclists' strength-testing machines for the purpose of testing and indicating the strength of a person applying leg-power to pedals on a rotary shaft operated in a manner similar to that of riding a bicycle, and it is carried out as follows, reference being had to the accompanying drawings, wherein—

Figure 1:
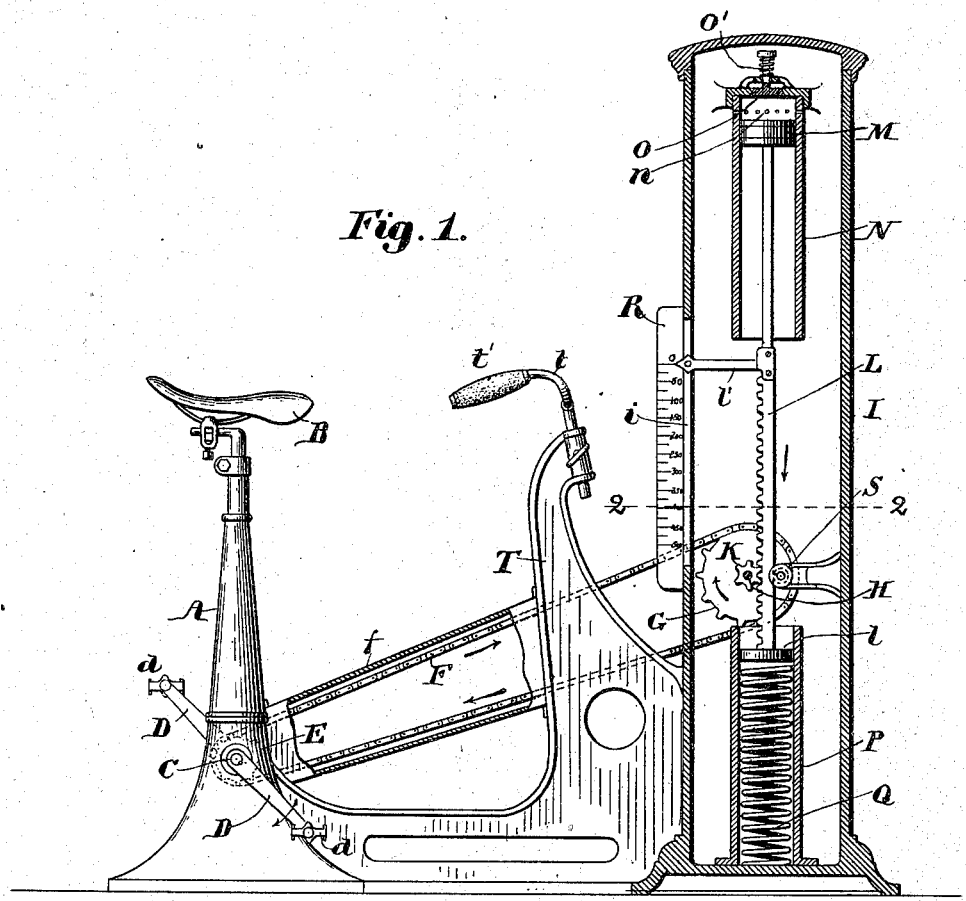
Figure 2:
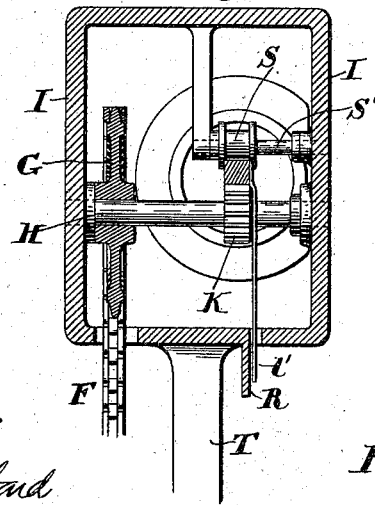

Figure 1 is a side elevation of my improved strength-testing machine, partly shown in section; and Fig. 2 is an enlarged cross-section on the line 2 2 shown in Fig. 1.

Similar letters refer to similar parts wherever they occur on the different parts of the drawings.

In the drawings, A represents a post or standard provided at its upper end with a vertically-adjustable bicycle-saddle B of any well-known size or pattern. In bearings in the said post is suitably journaled a shaft C, to the ends of which are secured cranks D D, provided with pedals *d d* in a manner similar to those employed on a bicycle. To the shaft C is secured a sprocket-wheel E. (Shown in dotted lines in Fig. 1.) From such sprocket-wheel leads a chain F to a sprocket-wheel G, secured to a shaft H, located in bearings in the sides of a preferably hollow standard or casing I, as shown.

To the sprocket-wheel shaft H is secured a pinion K, the teeth of which mesh in the teeth of a rack L, to the upper end of which is attached a piston M, movable in a cylinder N, the lower end of which is open, as shown in Fig. 1. The upper end of the cylinder N is normally closed by means of a valve O, seated in a perforated valve-seat in such end of the cylinder N and held in such closed position by means of a light spring O', interposed between the upper end of the spindle on said valve and a guide on the upper end of the cylinder N, as shown.

*n n n* are a series of perforations through the side of the upper end of the cylinder N, as shown in Fig. 1, for a purpose that will hereinafter be described. Within the lower portion of the casing I is located a cylinder P, containing a compressible coiled spring Q. (Shown in Fig. 1.) To the lower end of the rack L is secured a plate or piston *l*, resting upon the upper end of the coiled spring Q, as shown in Fig. 1. To the rack L is secured an index-pointer *l'*, projecting through a slotted opening *i* in the side of the casing I, and to the outside of the latter is secured a suitable graduated scale R, as shown.

In practice I prefer to locate an antifriction guide-roller S back of the rack L opposite to the pinion K, which roller is secured to a spindle S', suitably journaled in bearings in the casing I, as shown. Said roller serves as a back-support for said rack L while being moved downward against the spring Q by the pinion K and its connection to the pedal-shaft C.

In front of the post A is located a frame or standard T, preferably cast in one piece with the saddle-post A and casing I, as shown in Fig. 1, and to the upper end of said frame T is secured an adjustable handle-bar *t*, provided with a pair of handles *t'*, like those used on a bicycle, as shown in said Fig. 1.

*f* in Fig. 1 represents a tubular cover or chain-guard adapted to inclose the sprocket-chain F, so as to prevent the garment of the rider from being soiled by contact with said chain while seated on the saddle B.

The operation of this my improved strength-testing machine is as follows: The person while seated on the saddle B and grasping the handles on the handle-bar places his feet on the pedals *d d* and imparts a rotary motion to the shaft C, as is common in bicycle propulsion. The endless sprocket-chain F causes a rotary motion to be imparted to the sprocket-wheel G and pinion K in the direction of arrows shown in Fig. 1. The rotation of the pinion K causes the rack L to be forced downward against the influence of the coiled spring Q proportionate to the strength and power exerted by the rider, which may readily be ascertained by looking on the index-pointer and scale at the side of the casing I. During the downward motion of the rack L and piston M the valve O is drawn from its seat in the upper end of the cylinder N, causing the air to enter freely into the upper end of the cylinder through the valve-opening, so as to allow the piston M to move downward without resistance. After the operator has tested his strength as above described and alights from the saddle the coiled spring Q causes the rack L and piston M to move upward to the normal zero position, (shown in Fig. 1,) and during such upward motion of said parts the spring O' causes the valve O to close and causes the air in the cylinder N above the piston M to pass slowly out through the pin-holes $n\ n$, thus retarding such upward motion by the compression of the air above the piston M and causing the rack to move slowly upward to its normal zero position.

I have hereinabove shown and described the machine in its simplest form; but I wish to state that it may be differently arranged or geared without departing from the essence of my invention.

What I wish to secure by Letters Patent and claim is—

1. In a bicyclist's strength-testing machine, a seat, a pedal-wheel, a pinion operated by said pedal-wheel, a rack operated by said pinion, and means for retarding the movement of said rack.

2. In a bicyclist's strength-testing machine, a bicycle-saddle, a sprocket-wheel provided with pedals, a second sprocket-wheel, a sprocket-chain connecting said sprocket-wheels, a pinion operated by said sprocket-wheels, a rack operated by said pinion, and a spring in engagement with said rack.

3. In a bicyclist's strength-testing machine, a bicycle-saddle, a sprocket-wheel, provided with pedals, a second sprocket-wheel, a sprocket-chain connecting said sprocket-wheels, a pinion operated by said sprocket-wheels, a rack operated by said pinion, a spring bearing against one end of said rack, and a brake device bearing against the other end of said rack.

4. In a bicyclist's strength-testing machine, a bicycle-saddle, a pair of bicycle-handles, a sprocket-wheel provided with pedals, a second sprocket-wheel, a sprocket-chain connecting said sprocket-wheels, a pinion operated by said second sprocket-wheel, a rack operated by said pinion, a coil-spring bearing against one end of said rack, a cylinder having a non-return valve opening thereinto and having a plurality of perforations therein, a piston working in said cylinder, said piston being connected with said rack, an index-pointer connected with said rack, and a graduated scale arranged to be traversed by said pointer.

In testimony whereof I have affixed my signature in presence of two witnesses.

ROBERT W. BLAISDELL.

Witnesses:
ALBAN ANDRÉN,
THEKLA ANDRÉN.